(12) United States Patent
Matas et al.

(10) Patent No.: US 10,019,147 B2
(45) Date of Patent: *Jul. 10, 2018

(54) TILTING TO SCROLL

(71) Applicant: Facebook, Inc., Menlo Park, CA (US)

(72) Inventors: Michael Matas, Healdsburg, CA (US); Brian D. Amerige, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,791

(22) Filed: Sep. 30, 2016

(65) Prior Publication Data

US 2017/0024099 A1     Jan. 26, 2017

Related U.S. Application Data

(63) Continuation of application No. 13/846,131, filed on Mar. 18, 2013, now Pat. No. 9,459,705.

(51) Int. Cl.
| | |
|---|---|
| *G09G 5/14* | (2006.01) |
| *G06F 3/0485* | (2013.01) |
| *G06F 3/0346* | (2013.01) |
| *G06F 3/01* | (2006.01) |
| *G06T 15/00* | (2011.01) |

(52) U.S. Cl.
CPC ............ *G06F 3/0485* (2013.01); *G06F 3/017* (2013.01); *G06F 3/0346* (2013.01); *G06T 15/005* (2013.01)

(58) Field of Classification Search
CPC .................................................. G06F 3/0485
USPC ........................................................ 345/684
See application file for complete search history.

(56) References Cited

U.S. PATENT DOCUMENTS

| | | | |
|---|---|---|---|
| 6,466,198 B1 | 10/2002 | Feinstein | |
| 6,573,883 B1 | 6/2003 | Bartlett | |
| 8,381,102 B1 | 2/2013 | Scholler | |
| 9,459,705 B2 * | 10/2016 | Matas | G06F 3/0485 |

(Continued)

FOREIGN PATENT DOCUMENTS

| | | |
|---|---|---|
| CN | 102236436 A | 11/2011 |
| CN | 102272690 A | 12/2011 |
| EP | 1837736 A2 | 9/2007 |

OTHER PUBLICATIONS

Notice of Preliminary Rejection received from the Korean Patent Office, for Korean Patent Application No. 10-2015-7029945, dated Feb. 3, 2017.

(Continued)

*Primary Examiner* — Javid A Amini
(74) *Attorney, Agent, or Firm* — Baker Botts L.L.P.

(57) ABSTRACT

In one embodiment, a method includes sending information to display a visual content; determining a scroll range for the visual content based on dimensions of the visual content; determining an origin position within the visual content from which the visual content is configured to be scrolled, wherein the origin position is determined based on a type of an application associated with the visual content; receiving an initial tilt measurement of a client computing device; receiving a second tilt measurement of the client computing device; determining a progress parameter based on at least the scroll range, the origin position, the initial tilt measurement, and the second tilt measurement; and sending information to scroll the visual content based on the progress parameter.

30 Claims, 4 Drawing Sheets

(56) References Cited

U.S. PATENT DOCUMENTS

| | | |
|---|---|---|
| 2008/0165210 A1 | 7/2008 | Platzer et al. |
| 2009/0197635 A1 | 8/2009 | Kim et al. |
| 2011/0074671 A1 | 3/2011 | Shimosato et al. |
| 2012/0011464 A1 | 1/2012 | Hayashi et al. |

OTHER PUBLICATIONS

Notice of Acceptance received from the Australian IP Government, for Australian Patent Application No. 2014236107, dated Apr. 13, 2017.
Extended European Search Report received from the European Patent Office, for European Patent Application No. 14768576.2-1972 / 2976697, dated Oct. 28, 2016.
Chinese Office Action received from the People's Republic of China, for Chinese Patent Application No. 201480028813X, dated Dec. 1, 2017.
European Office Action received from the EPO, for European Patent Application No. 14 768 576.2-1972, dated Nov. 20, 2017.

\* cited by examiner

TILTING TO SCROLL

PRIORITY

This application is a continuation under 35 U.S.C. § 120 of U.S. patent application Ser. No. 13/846,131, filed 18 Mar. 2013.

TECHNICAL FIELD

This disclosure generally relates to image display and the viewing experience.

BACKGROUND

A computing device—such as a smartphone, tablet computer, or laptop computer—may include integrated components for determining its direction, or orientation, such as a compass, accelerometer, or gyroscope, and/or an interface to one or more external such components. Such a device may also include one or more integrated display screens and/or an interface to one or more external display screens. Mobile computing devices may also execute software applications, such as games, map applications, web browsers, personal information management applications, work productivity applications, or social-networking applications.

SUMMARY OF PARTICULAR EMBODIMENTS

When an image is displayed on a screen that is not big enough to display the whole of the image at once, particular embodiments may enable a user to scroll the image in one or more directions, along one or more axes, by using a tilting motion. The image may comprise any visual content that can be displayed on the screen, including, by way of example and not limitation, a photo, a number of photos represented as a photo album, a list of emails, a web page, a map, a visual representation of a library of music, a video game, or a technical diagram.

The computing device may determine a scroll range for the image, measure initial tilt according to a gyroscope, and determine an origin position for the image. Once the computing device receives an indication from the gyroscope that movement satisfying a threshold for activating scrolling has been satisfied, the computing device calculates a progress parameter, based on the input from the sensor(s) and the scroll range. The computing device then updates the presentation of the image based on the progress parameter. As the computing device continues to receive indications from the sensor(s) that movement is detected, the computing device continues to update presentation of the image appropriately. The computing device may also receive user input to re-calibrate the origin position, at which point scrolling may continue based on the new origin position.

DESCRIPTION OF EXAMPLE EMBODIMENTS

When an image is displayed on a screen that is not big enough to display the whole of the image at once, particular embodiments may enable a user to scroll the image in one or more directions by using a tilting motion. The image may comprise any visual content that can be displayed on the screen, including, by way of example and not limitation, a photo, a number of photos represented as a photo album, a list of emails, a web page, a map, a visual representation of a library of music, a video game, or a technical diagram.

The computing device may determine a scroll range for the image, measure initial tilt according to a gyroscope, and determine an origin position for the image. Once the computing device receives an indication from the gyroscope that movement satisfying a threshold for activating scrolling has been satisfied, the computing device calculates a progress parameter, based on the input from the sensor(s) and the scroll range. The computing device then updates the presentation of the image based on the progress parameter. As the computing device continues to receive indications from the sensor(s) that movement is detected, the computing device continues to update presentation of the image appropriately. The computing device may also receive user input to re-calibrate the origin position, at which point scrolling may continue based on the new origin position.

Figure 1B:
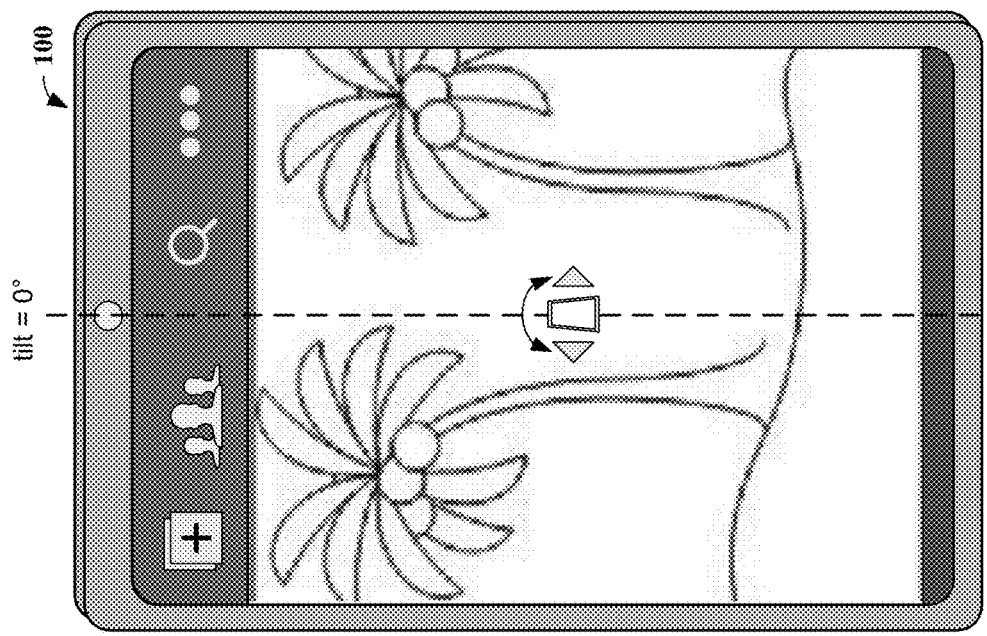
FIGS. 1A-F are wireframes illustrating scrolling an image according to particular embodiments disclosed herein.
Figure 1A:
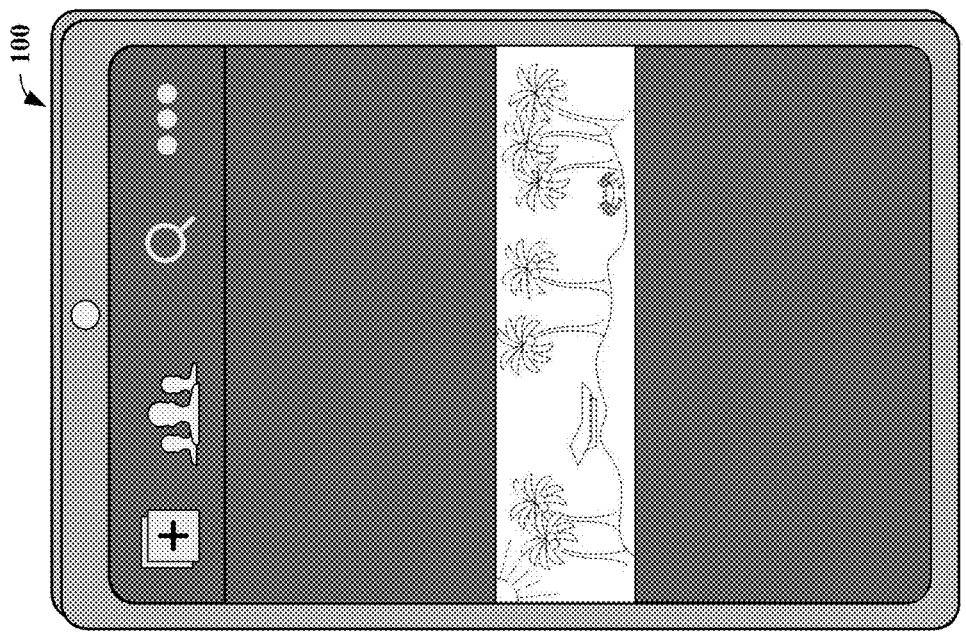
Figures 1C, 1D, 1E, 1F:
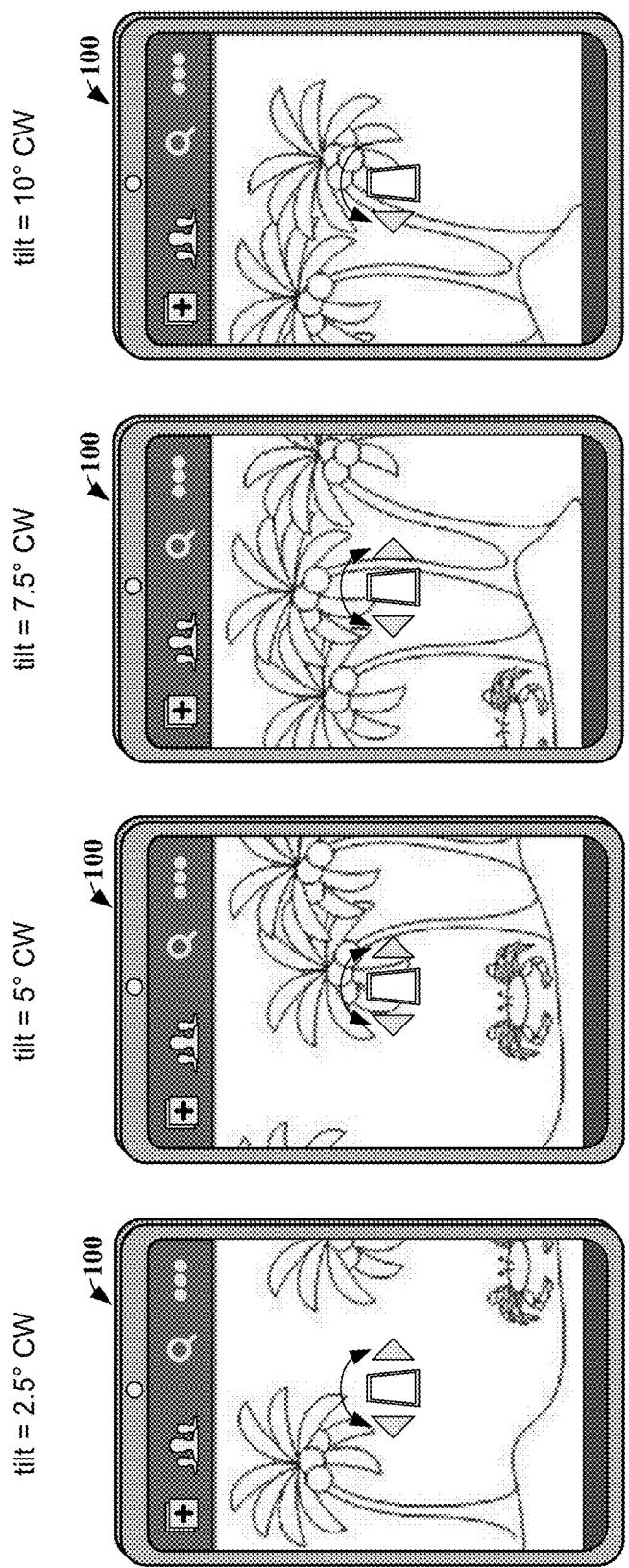

FIGS. 1A-F are wireframes illustrating an example use case of scrolling an image according to particular embodiments disclosed herein. As shown in FIG. 1A a user may use a computing device, such as a smartphone, to view a panoramic photo of a beach scene that, when resized so that the whole image appears on the screen, is far too small to view much detail. Embodiments of a computing device are described in further detail with respect to FIG. 3. The user may be able to zoom in on the image so that the complete vertical extent of the image fills the whole display region, as illustrated in FIG. 1B. At this point, the user can tilt the smartphone from side to side along a vertical axis (shown as a dotted line in FIG. 1B) planar to the display screen to scroll back and forth through the panoramic image and view the entirety of the panoramic image from the left edge of the image to the right edge of the image and vice versa. In another example, a user may use the smartphone to view a list of contacts and tilt the smartphone up and down along a horizontal axis planar to the display screen to scroll the list of contacts. In another example, a user may use the smartphone to view a map and tilt the smartphone in any direction along a horizontal axis and a vertical axis planar to the display screen to scroll the map. Within the scope of this disclosure, "tilting" refers to any motion that may be measured by a gyroscope, and measurement of "tilt" refers to any measurements of roll, pitch, yaw, or any combination thereof that may be measured by a gyroscope. Although some embodiments described herein may refer to a single axis around which tilting may occur, one of skill in the art would be aware that the scrolling methods described herein may be implemented with respect to more than one axis.

In particular embodiments, as shown in the example illustrated in FIG. 1B, when the image is displayed (immediately after the zoom-in command is received), the photo is presented so as to be centered with respect to the overall panoramic image—this origin position is the position in the image from which scrolling may commence. In particular embodiments, the origin position may be set at some position in the image in accordance with a particular application. For example, in an application where the user is asked to browse through a panoramic image of a shelf of books at a library to find one or more particular books by visual recognition, the origin position may be set at the left edge of the image. In another example, for a list of contacts, the origin position may be set at the top of the list, or at the first entry in the contact list for a selected letter of the alphabet, from which the user may scroll down (and back up). In particular embodiments, the origin position may be set at some position in the image in accordance with a user selection. For example, when displaying a map of the United States, the origin position may be set at a location selected by the user (e.g., the Grand Canyon region), from which the user may scroll around the map in any direction. In particular embodiments, the origin position may be set at any appropriate position in the image in accordance with relevant factors.

In particular embodiments, as indicated by the example illustrated in FIG. 1B, when the image is displayed (again, immediately after the zoom-in command is received), the computing device may also display a visual hint encouraging the user to begin scrolling and/or notifying the user that such a feature is available. The hint may indicate in which direction(s) scrolling is possible—as shown in FIG. 1B, scrolling is possible in both directions, while in FIG. 1F, scrolling is only possible in one direction (since the edge of the image has been reached).

FIGS. 1C-F illustrate an example of scrolling a zoomed-in display of the panoramic photo of FIG. 1A, starting from the origin position and initial tilt of 0° shown in FIG. 1B. As shown in FIGS. 1C-F, as the user commences tilting the computing device clockwise (with respect to the user holding the computing device) from an initial tilt, the computing device detects the movement by measuring the change in tilt. Once a threshold to activate scrolling has been satisfied (e.g., tilting the computing device beyond a minimum delta of 2° from the initial tilt in either direction, or tilting the computing device faster than a minimum rotation rate in either direction), the computing device commences scrolling the image in accordance with the measured tilt. As shown in FIGS. 1C-F, as the tilt increases, the extent to which the image is scrolled also increases until the edge of the image is reached in FIG. 1F, when the user has tilted the computing device to degree required to reach the edge.

Figure 2:
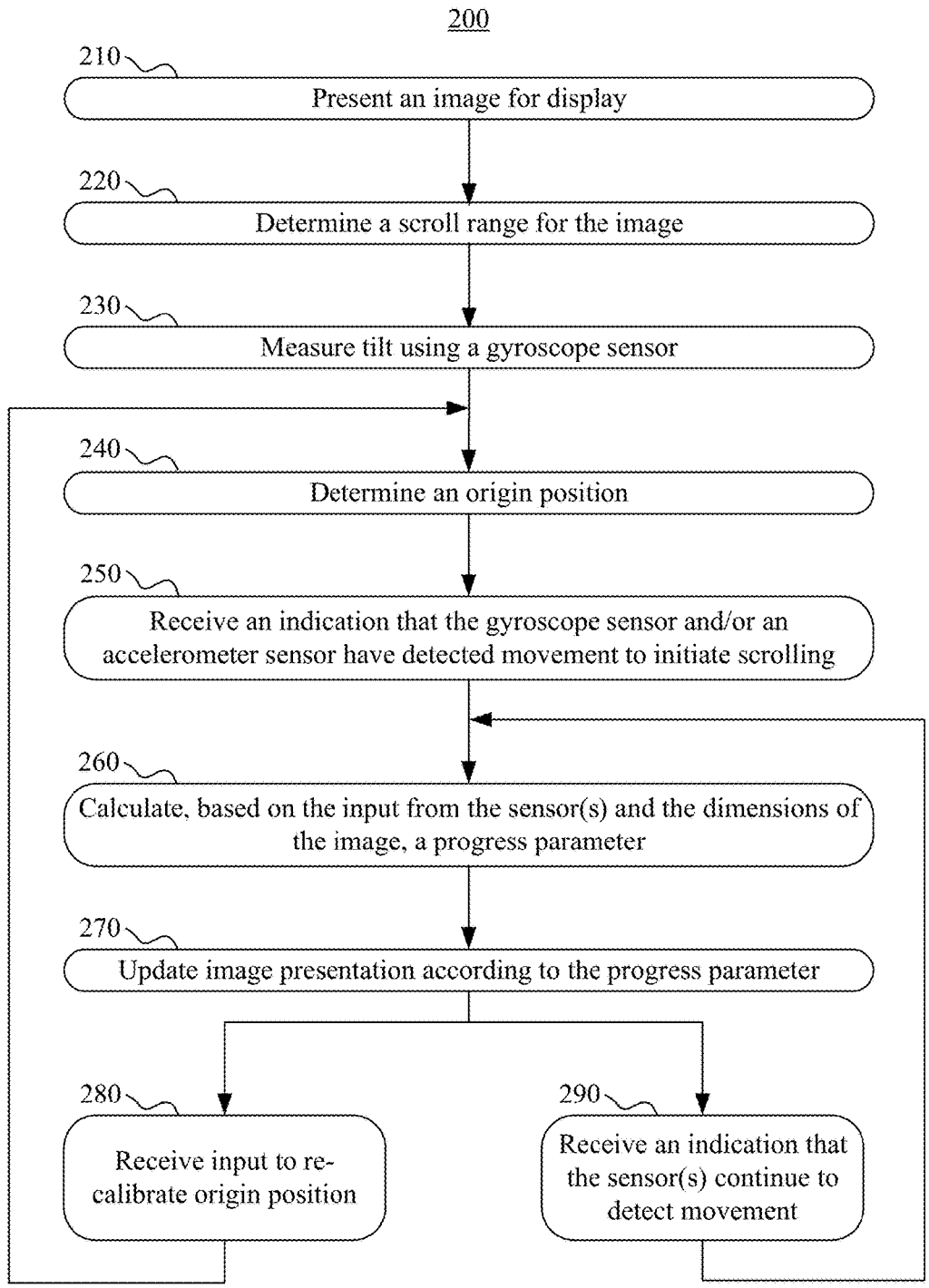
FIG. 2 illustrates an example method for scrolling an image according to particular embodiments disclosed herein.

FIG. 2 illustrates an example method 200 for scrolling an image according to particular embodiments. The method may begin at step 210, where a computing device presents an image for display. In particular embodiments, the computing device may comprise a handheld device with an integrated display screen. In particular embodiments, the computing device may be connected to an external display screen. Within the scope of this disclosure, a first component is said to be connected to a second component when it is physically connected (e.g., via a wire or cord), wirelessly connected (e.g., via BLUETOOTH, Near-Field Communications (NFC), RF, or Wi-Fi), or connected through any other kind of network (e.g., a LAN, private WAN, or the Internet).

At step 220, the computing device determines a scroll range for the image with respect to an axis. In particular embodiments, the scroll range is determined based on the aspect ratio of the image as well as the absolute dimensions of the image, e.g., scrollRange=((photoWidth/photoHeight) *(DEGREES_TO_RADIANS (tiltRange)/(length/height))), where tiltRange is the degrees of tilt required to scroll from one edge of the image to the opposite edge, and length× height is the aspect ratio of the image (where length is the dimension along which scrolling may occur). The tiltRange parameter may vary in accordance with the aspect ratio of the image, so that a larger tiltRange may be used for scrolling along the length of a panoramic image with an aspect ratio of 3×1, while a smaller tiltRange may be used for scrolling along the length of a 3×3 image. In particular embodiments, tiltRange may also be constrained to ensure that the user is not required to tilt the device to such an extent that it is awkward for the user to view the screen.

At step 230, the computing device measures tilt using a gyroscope sensor. The measured tilt comprises an initial tilt from which any change in tilt will be measured. For example, if a handheld computing device with an integrated gyroscope that is displaying a panoramic image with a horizontal orientation measures the tilt with respect to a vertical axis as being 0.3°, because a user holding the device is holding it almost perfectly level, any tilt measured in relation to subsequent motion registered by the device will be measured as a delta from that initial tilt. In particular embodiments, if the overall orientation changes while the user is viewing that same image (e.g., if the user lies down on their side while using the smartphone), the computing device may update the initial tilt so as to preserve the axis for scrolling the presentation of the image with respect to the display while appropriately applying subsequent tilt measurements to determine the progress parameter. Any tilt measured in relation to subsequent motion registered by the device will be measured as a delta from that updated initial tilt. As indicated in the example shown in FIG. 1B, the initial tilt is measured at 0°. In particular embodiments, the computing device may comprise a handheld device with an integrated gyroscope. In particular embodiments, the computing device may be connected to an external handheld controller comprising a gyroscope.

At step 240, the computing device determines an origin position. As described above with respect to FIG. 1B, the origin position may be set at a particular position in the image in accordance with a particular application, in accordance with a user selection, or at any appropriate position in the image in accordance with relevant factors.

At step 250, the computing device receives an indication that the gyroscope sensor has detected movement that satisfies a threshold for activating scrolling. As discussed above, a threshold may need to be satisfied in order to activate scrolling—this may help to prevent typical hand tremors from triggering scrolling of the image. In one example embodiment, the threshold may comprise a minimum change in measured tilt, with respect to the initial tilt, in either direction. In another example embodiment, the threshold may comprise a minimum rotation rate in either direction (e.g., where the scrolling function is activated by a sharp tilting flick of the computing device).

At step 260, the computing device calculates, based on the input from the sensor(s) and the scroll range, a progress parameter that indicate how to scroll the image. The progress parameter may comprise one or more attributes, including, by way of example and not limitation, (1) the preceding tilt measurement reported by the gyroscope, (2) the current tilt measurement reported by the gyroscope, (3) a delta between the preceding tilt measurement reported by the gyroscope and the current tilt measurement, wherein the gyroscope samples measurements at regular intervals, (4) a rotation rate calculated based on the delta between the preceding tilt measurement reported by the gyroscope and the current tilt measurement, (5) an offset of the origin position with respect to the absolute position as determined for the last tilt measurement, or (6) an offset of the origin position with respect to the absolute position as determined for the current tilt measurement reported by the gyroscope. In particular embodiments, the progress parameter may be required to meet a minimum rotation rate, so as to prevent gradual changes in the user's device-holding stance from triggering scrolling.

In particular embodiments, the input may be clipped to limit the input data to the dimensions of the image (so that the user cannot scroll beyond the scroll range). In particular embodiments, the input data received from the gyroscope may be smoothed to reduce or eliminate shakiness due to hand tremors and produce a smooth scrolling motion. Smoothing the input may comprise applying a low-pass filter to the input data (to eliminate spikes in the input) and/or applying an RK4 (Runge-Kutte) solver to the input (to produce a steadily progressive and smooth scrolling motion).

At step 270, the computing device updates the image presentation to show scrolling of the image based on the progress parameter. The image presentation may include special effects, such as a virtual spring effect (e.g., the image bounces when scrolled to the edge of the image and "hits" the edge and/or the image scrolling slows down as the edge approaches and the virtual spring is stretched farther). In particular embodiments, movements of an image displayed on a screen may be simulated by attaching one end of a virtual spring to the image at the origin position and another end of the virtual spring to a position on the screen (e.g., the center of the screen, a corner of the screen, or an edge of the screen). Any number of virtual springs may be attached to an object. In particular embodiments, the movements of the object may be determined based on Hooke's law: $F=-kx$; where x is the displacement of the spring's end from its equilibrium position (e.g., a distance, in SI units: meters), F is the restoring force exerted by the spring on that end (in SI units: N or kg·m/s2), and k is a constant called the rate or spring constant (in SI units: N/m or kg/s2). When this equation holds, the behavior is said to be linear. The negative sign on the right hand side of the equation is there because the restoring force always acts in the opposite direction of the displacement (e.g., when a spring is stretched to the left, it pulls back to the right). In general, the following properties are involved in determining spring movement: mass, damping, spring stiffness, spring rest length. In some implementations, a virtual mass may be assigned to the object.

In particular embodiments, a virtual spring may have different state values based on attributes of the image being displayed. The spring may ramp from one set of state value to another, instead of cutting, to make animation sequence of the object's movements appear more natural. For example the distance between an edge of the image and the origin position may be used to determine the tightening of the springs used in the animation or the level of ramping from one set of state values to another.

In particular embodiments, a physics engine implements the algorithms that simulate spring movement. One or more virtual springs may be attached to an object. For example, if a computing device is tilted so as to activate scrolling of an image displayed on a screen, a virtual spring may be attached to the origin position in the image. As the object moves (e.g., scrolled by the tilting motion), its movement follows the paths of the virtual spring, so that the movement of the object is animated based on the physics of the spring's movement. In particular embodiments, the algorithm may take into consideration variables such as tension, mass, damping effect, the measured tilt, etc. As an example, as the image is scrolled away from the origin position and closer to an edge (thereby stretching the spring further), the scrolling speed may slow down. Conversely, as the image is scrolled back towards the origin position, the scrolling speed may speed up. In another example, as the image scrolls away from the origin position and "hits" the edge, the image may appear to bounce upon reaching the edge.

In particular embodiments, when zooming in on an object, the object increases in size. When zooming out on an object, the object decreases in size. The changing of the object's size may be depicted in an animation sequence, where the movements of the object may be based on spring movements. In particular embodiments, as an object moves towards its final destination, the intermediate positions of the object may be interpolated based on spring movements. When the origin position is re-calibrated based on designation of a new origin position, the virtual spring may be re-attached to the new origin position.

At step 280, the computing device may receive input to re-calibrate the origin position at a new origin position. After the user has scrolled away from the origin position to a new position, the user may re-calibrate the origin position at the new position (e.g., clicking and holding a finger down on the new position). In that case, the computing device may return to step 240 to determine the new origin position, and then continue to provide scrolling functionality, based on the new origin position.

At step 290, the computing device may receive continued indications that the sensor(s) are detecting movement as the user continues to tilt the computing device. In particular embodiments, the method of FIG. 2 may be repeated from step 260 as long as the sensor(s) detect continuous movement. In particular embodiments, if the computing device detects a lack of movement for longer than a threshold period of time, or if the computing device detects that the magnitude of the motion detected by the sensor(s) has dropped below a threshold, the computing device may return to step 250, or it may take over and automatically pan through the image.

In particular embodiments, when an image is first displayed on the screen, it may automatically pan through the image once, and then, once the pan is complete, the image may be available for scrolling by tilting the computing device. In connection with panning through images, particular embodiments may utilize one or more systems, components, elements, functions, methods, operations, or steps disclosed in U.S. patent application Ser. No. 13/676,831, entitled "Image Panning and Zooming Effect" and filed 14 Nov. 2012, which is incorporated herein by reference as an example and not by way of limitation.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
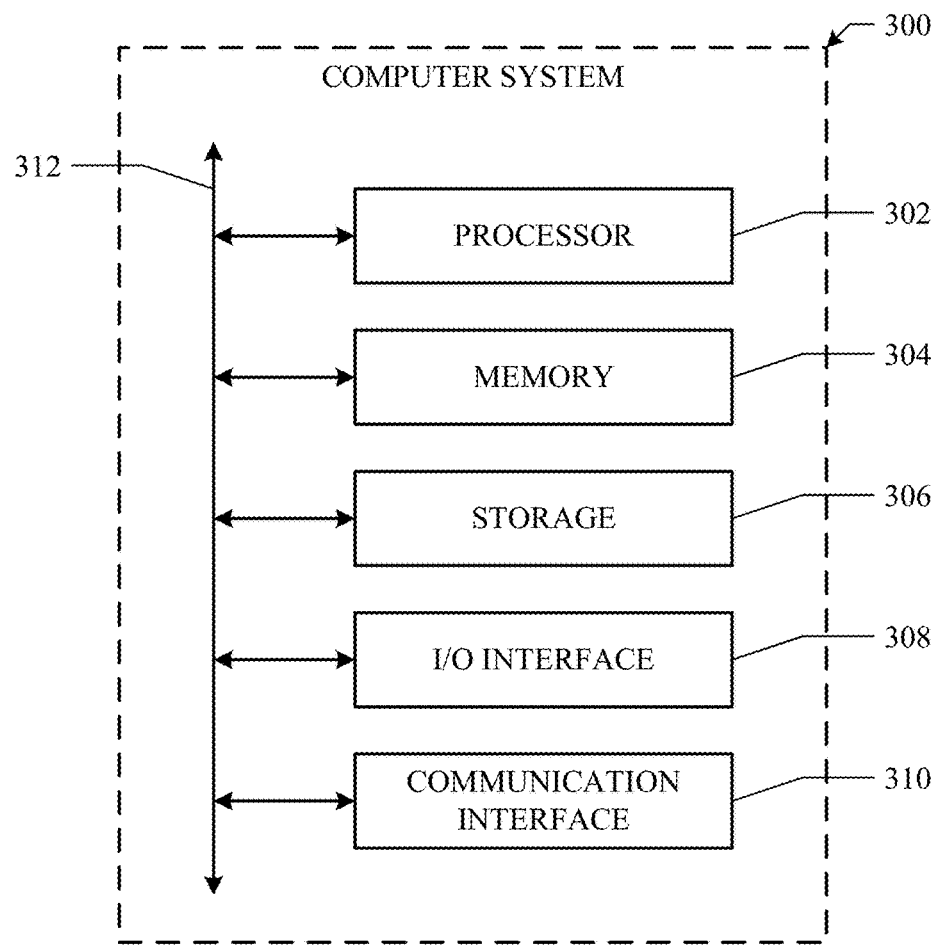
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, sending information to display a visual content item;
   by the computing device, determining a scroll range for the visual content item based on one or more dimensions of the visual content item;
   by the computing device, determining an origin position within the visual content item, wherein the origin position is an initial position in the visual content item from which the visual content item is to be scrolled, and wherein the origin position is determined based on a type of an application associated with the visual content item;

by the computing device, receiving an initial tilt measurement of a client computing device;

by the computing device, receiving a second tilt measurement of the client computing device;

by the computing device, determining a progress parameter based on at least the scroll range, the origin position, the initial tilt measurement, and the second tilt measurement; and by the computing device, sending information to scroll the visual content item based on the progress parameter.

2. The method of claim 1, wherein a threshold for activating scrolling is satisfied by the tilt measurements.

3. The method of claim 1, wherein a threshold for activating scrolling is satisfied by a rotation rate that is calculated based on a delta between the initial tilt measurement and the second tilt measurement.

4. The method of claim 1, further comprising applying a RK4 (Runge-Kutta) solver to the tilt measurements to eliminate noise.

5. The method of claim 1, further comprising applying a virtual spring effect to the visual content item in relation to the origin position.

6. The method of claim 5, wherein the virtual spring effect causes the scrolling of the visual content item to appear to bounce when a limit of the scroll range is reached.

7. The method of claim 5, wherein the virtual spring effect causes the scrolling of the visual content item to appear to slow down as a limit of the scroll range is approached.

8. The method of claim 1, further comprising:
receiving input to re-calibrate the origin position; and
determining a new origin position based on the input.

9. The method of claim 1, wherein the tilt measurements are based upon motion captured by a gyroscope with respect to a single axis planar with respect to a presentation of the visual content item.

10. The method of claim 1, wherein the tilt measurements are based upon motion captured by a gyroscope with respect to two axes orthogonal with respect to each other, both of which are planar with respect to a presentation of the visual content item.

11. The method of claim 1, wherein the visual content item comprises a photo, a number of photos represented as a photo album, a list, a web page, a map, a visual representation of a library of items, a video game, or a technical diagram.

12. The method of claim 1, further comprising sending a visual hint indicating that scrolling may be performed on the visual content item.

13. The method of claim 12, wherein the visual hint further indicates one or more directions in which scrolling is possible.

14. One or more computer-readable non-transitory storage media embodying software that is operable when executed to:
send information to display a visual content item;
determine a scroll range for the visual content item based on one or more dimensions of the visual content item;
determine an origin position within the visual content item, wherein the origin position is an initial position in the visual content item from which the visual content item is to be scrolled, and wherein the origin position is determined based on a type of an application associated with the visual content item;
receive an initial tilt measurement of a client computing device;
receive a second tilt measurement of the client computing device;
determine a progress parameter based on at least the scroll range, the origin position, the initial tilt measurement, and the second tilt measurement; and
send information to scroll the visual content item based on the progress parameter.

15. The media of claim 14, wherein the tilt measurements are based upon motion captured by a gyroscope with respect to a single axis planar with respect to a presentation of the visual content item.

16. The media of claim 14, wherein the tilt measurements are based upon motion captured by a gyroscope with respect to two axes orthogonal with respect to each other, both of which are planar with respect to a presentation of the visual content item.

17. A system comprising:
one or more processors; and
a memory coupled to the processors comprising instructions executable by the processors, the processors being operable when executing the instructions to:
send information to display a visual content item;
determine a scroll range for the visual content item based on one or more dimensions of the visual content item;
determine an origin position within the visual content item, wherein the orgin position is an initial position in the visual content item from which the visual content item is to be scrolled, and wherein the origin position is determined based on a type of an application associated with the visual content item;
receive an initial tilt measurement of a client computing device;
receive a second tilt measurement of the client computing device;
determine a progress parameter based on at least the scroll range, the origin position, the initial tilt measurement, and the second tilt measurement; and
send information to scroll the visual content item based on the progress parameter.

18. The system of claim 17, wherein the processors are further operable when executing the instructions to apply a virtual spring effect to the visual content item in relation to the origin position.

19. The system of claim 18, wherein the virtual spring effect causes the scrolling of the visual content item to appear to bounce when a limit of the scroll range is reached.

20. The system of claim 18, wherein the virtual spring effect causes the scrolling of the visual content item to appear to slow down as a limit of the scroll range is approached.

21. The media of claim 14, wherein a threshold for activating scrolling is satisfied by the tilt measurements.

22. The media of claim 14, wherein a threshold for activating scrolling is satisfied by a rotation rate that is calculated based on a delta between the initial tilt measurement and the second tilt measurement.

23. The media of claim 14, further comprising applying a RK4 (Runge-Kutta) solver to the tilt measurements to eliminate noise.

24. The media of claim 14, further comprising applying a virtual spring effect to the visual content item in relation to the origin position.

25. The media of claim 24, wherein the virtual spring effect causes the scrolling of the visual content item to appear to bounce when a limit of the scroll range is reached.

26. The media of claim 24, wherein the virtual spring effect causes the scrolling of the visual content item to appear to slow down as a limit of the scroll range is approached.

27. The media of claim 14, further comprising:
receiving input to re-calibrate the origin position; and
determining a new origin position based on the input.

28. The media of claim 14, wherein the visual content item comprises a photo, a number of photos represented as a photo album, a list, a web page, a map, a visual representation of a library of items, a video game, or a technical diagram.

29. The media of claim 14, further comprising sending a visual hint indicating that scrolling may be performed on the visual content item.

30. The media of claim 29, wherein the visual hint further indicates one or more directions in which scrolling is possible.

\* \* \* \* \*